United States Patent [19] | [11] 4,387,697
Duke | [45] Jun. 14, 1983

[54] ARROW POINT PULLER AND BOW STABILIZER

[76] Inventor: J. Douglas Duke, 7010 Ficken Rd., Cedar Hill, Mo. 63016

[21] Appl. No.: 211,240

[22] Filed: Nov. 28, 1980

[51] Int. Cl.[3] .............. B23P 19/04

[52] U.S. Cl. .............. 124/89; 29/254; 273/419

[58] Field of Search .............. 124/23 R, 24 R, 89; 29/254

[56] References Cited

U.S. PATENT DOCUMENTS 4,043,020 8/1977 Hoggard .............. 29/254
4,150,469 4/1979 Hoggard .............. 29/254
4,169,454 10/1979 Jones .............. 124/89

*Primary Examiner*—Richard C. Pinkham
*Assistant Examiner*—William R. Browne
*Attorney, Agent, or Firm*—Haverstock, Garrett & Roberts

[57] ABSTRACT

An arrow point puller is provided having a shaft member, an anvil member at one end of the shaft member, and an arrow point connecting portion at the other end for connection to an arrow point embedded in a tree or the like. A hammer member is detachably connected to one end of the shaft member for slideable movement along the shaft member to impart longitudinal hammer blows to the anvil member thereby linearly applying withdrawal force to an embedded point to withdraw the point without applying bending or twisting moment to either the embedded arrow point or the arrow point puller assembly. The subject arrow point puller also includes apparatus for attaching it to an archery bow for use as a stabilizer.

9 Claims, 3 Drawing Figures

ARROW POINT PULLER AND BOW STABILIZER

The present invention relates to an arrow point puller which may be used in combination with an archery bow as a stabilizer.

Many arrows used in bow hunting and archery competition have a threaded connection between the arrowhead or point and the arrow shaft for screwing the point onto the shaft. This connection, making the point removable from the shaft, is especially important if the point becomes embedded in a tree or other object. Many times if the point is solidly embedded, it cannot be withdrawn without bending the arrow shaft or damaging the point, or both of these. The threaded connection allows the shaft to be unscrewed from the point and then the point may be either abandoned or removed by prying the arrow point out of the tree or cutting the point out with a knife or other tool. All of these procedures are time consuming, require special tools and usually result in damage to the point.

The closest known prior art to the present device is the arrow point puller which doubles as a bow stabilizer disclosed in Jones U.S. Pat. No. 4,169,454. This prior art arrow point puller has a weighted head portion with a cross-bore, and requires a shaft member for passing through the cross-bore to form a lever that is used for prying an embedded arrow point free. This is done after the puller head has been screwed onto the embedded arrow point. Use of the Jones puller is unsatisfactory in many situations because it requires that the embedded arrow point be removed by applying either twisting or prying force to free it, and these conditions can, and often do, damage the embeded arrow point and may also result in bending the shaft of the puller, thereby reducing its effectiveness as a stabilizer. The Jones device also requires that the user separate the rod member from the head member which is attached to the arrow point which is not true of the present device.

The present device, by contrast, has a shaft member with an enlarged attached anvil portion at one end, a connecting means for attaching it to an arrow point including one that is embedded at the other end, and a rod portion therebetween. A hammer member which is threadably attached to one end of the device when not in use and forms an important part of the device when the device is attached to a bow as a stabilizer, is slideable along the rod portion when used for removing an embedded point so that it can be repeatably moved into striking engagement with the anvil to impart the necessary withdrawal force to extract the embedded point. The hammer blows serve to gradually back the embedded arrow point out and in a direction that is along the longitudinal axis of the arrow point, thereby completely eliminating any bending or twisting moment which might cause damage to the point.

It is therefore a principle object of the invention to provide an improved arrow point puller for use in extracting embedded arrow points without imparting bending or twisting moment to the embedded point.

Another object is to provide an arrow point puller having cooperatively engageable hammer and anvil means, one of which is connectable to an embedded arrow point to be withdrawn so that thereafter withdrawal force can be imparted in a direction along the axis of the embedded point.

Another object is to provide an arrow point puller whose parts remain assembled at all times, thereby decreasing the possibility that one or more component parts will be lost.

Another object is to provide an arrow point puller that is also usable as an archery bow stabilizer.

Another object is to reduce the cost of archery by reducing the loss or damage to arrowheads.

Another object is to eliminate the need to carry special tools to remove arrowheads that become embedded in trees and other objects.

These and other objects and advantages of the present invention will become apparent after considering the following detailed specification in conjunction with the accompanying drawings wherein.

Figures 1, 2, 3:
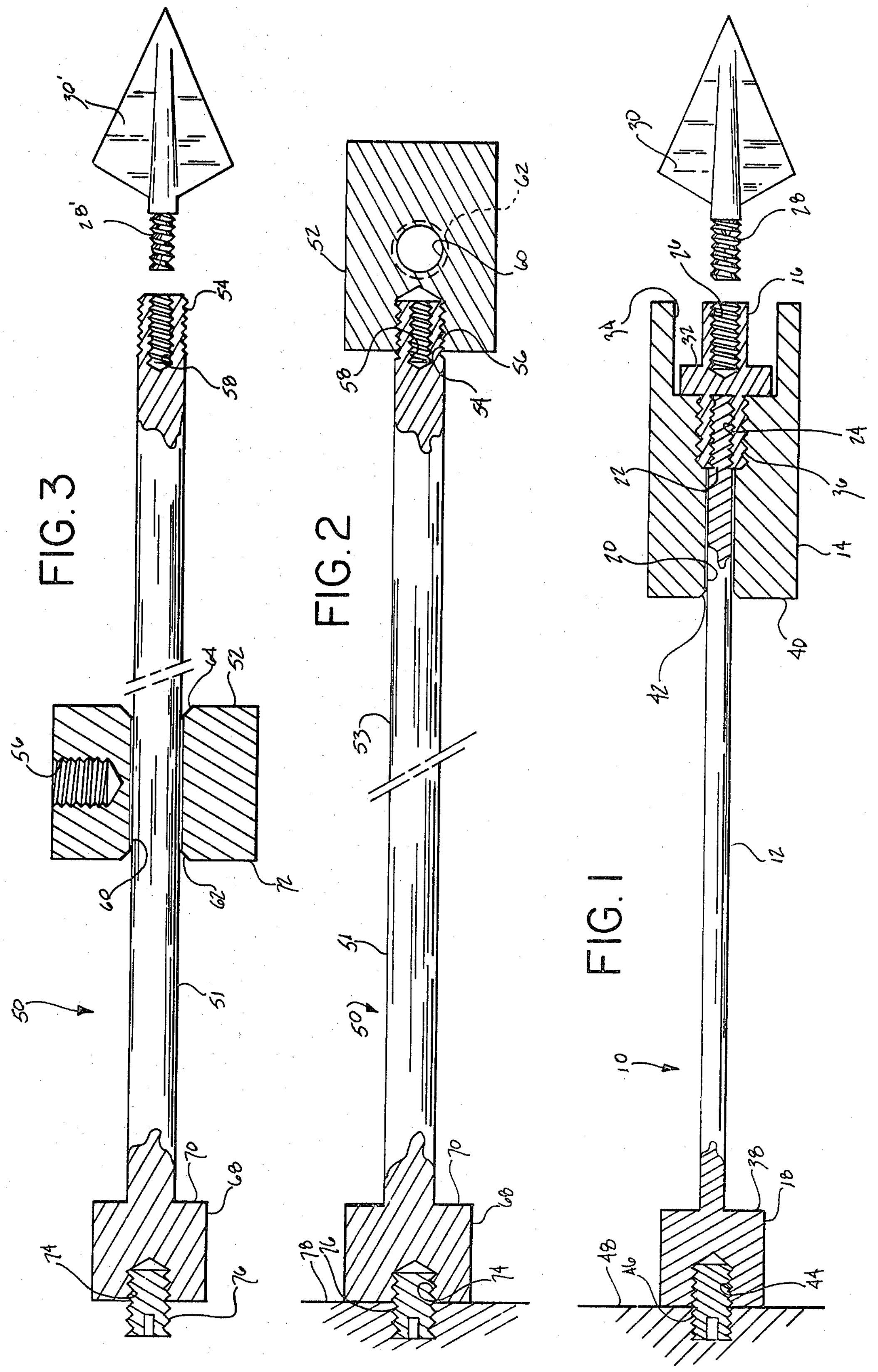
FIG. 1 is a cross-sectional view taken along the axis of one embodiment of an arrow point puller/stabilizer device constructed according to the present invention.
FIG. 2 is a cross-sectional view of another embodiment of an arrow point puller/stabilizer device constructed according to the present invention, said device being shown attached to an archery bow to serve as a bow stabilizer; and, FIG. 3 is another cross-sectional view of the embodiment shown in FIG. 2 but shown rearranged to serve as an arrow point puller.

Referring to the drawings more particularly by reference numbers, number 10 in FIG. 1 identifies an arrow point puller assembly constructed according to one embodiment of the present invention. The assembly 10 includes a shaft member 12, a hammer member 14, and a connector member 16. The shaft member 12 has an enlarged end portion 18, and the hammer member 16 has a bore 20 therethrough which is slightly larger in diameter than the shaft member 12. The end of shaft member 12 opposite from the enlarged end 18 has a reduced diameter threaded extension 22 which screws into a threaded bore 24 in one end of the connector member 16. The opposite end of connector member 16 has another threaded bore 26 that extends therein which is sized to cooperatively engage the threaded tail portion 28 of an arrow point 30. Most arrow points that have a threaded portion such as the portion 28, which portion attaches to the arrow shaft, use a standard size thread which means that a single arrow point puller can be used with all of them. This is true with broadhead hunting points such as that illustrated, field points and points used for other purposes.

The connector member 16 has an annular collar 32 which is small enough to fit into a counter bore 34 in the hammer member 14 such that when the connector member 16 is seated in the counter bore 34, as shown, it is fully within the hammer member 14. This provides protection for the connector member 16 and especially for the threaded bore 26 therein.

A threaded connection 36 is provided between the inward end of the connector member 16 and that portion of the central bore 20 adjacent the counter bore 34. This allows the hammer member 14 to be threadedly engaged with the connector member 16 as shown in FIG. 1.

The enlarged end 18 of the shaft member 12 has a flat face 38 formed thereon, perpendicular to the axis of the shaft member 12 providing an anvil surface for striking engagement with the face 40 on the inward end of the hammer member 14. The inward end of the bore 20 through the hammer member 14 may also be beveled or filleted at 42 such that when the threaded connection 36 between the hammer member 14 and the connector member 16 is unscrewed, the hammer member 14 will slide freely along the shaft member 12 as it is used to impart hammer blows against the anvil face 38 of the enlarged end portion 18. The enlarged end 18 also has a threaded bore 44 formed in the free end on the axis of the shaft 12 for accepting a stud 46, the other end of which is attachable to bow 48.

The length and weight of the arrow point puller assembly 10 is preferably manufactured to the exacting specifications adopted by various archery organizations for archery bow stabilizers. Thus, the assembly 10 can be conveniently connectable to an archery bow for use as a stabilizer until needed as an arrow point puller, and it has no parts that are separate or need to be carried separately. This is an important convenience advantage. When an arrow point becomes embedded in a tree or other object, the assembly 10 is unscrewed from the archery bow 48, the hammer member 14 is unscrewed from the connector member 16 exposing the threaded bore 26 which is then screwed onto the threaded tail-piece or end 28 of the embedded arrow point 30. The hammer member 14 is then used to impart sharp axially aligned blows to the anvil surface 38 for linearly translating the arrow point straight backwards out of its embedded position without imparting any bending or twisting moment to the embedded point or to the shaft member 12 of the puller. When the arrow point has been extracted, it is unscrewed from bore 26, the hammer member 14 is reattached to the connector member 16, and the assembly 10 is reconnected to the bow 48 to again act as a stabilizer. Since the shaft member 12 always remains extending through the bore 20 in the hammer member 14, the hammer member 14 is never separated from the shaft member 12, thereby decreasing the possibility that the hammer member 14 will inadvertently become separated from the assembly 10 and lost.

A second embodiment 50 of an arrow point puller is shown in FIGS. 2 and 3. The assembly 50 has a shaft member 51 and a hammer member 52. The shaft member 51 is externally threaded at end 54 for threadedly cooperating with a threaded bore 56 in one side of the hammer member 52. The same end of the shaft 51 has a smaller internally threaded bore 58 which is of a size to threadedly cooperate with the threaded tail portion 28' of arrow point 30'.

The hammer member 52 has a cross-bore 60, the inside diameter of which is slightly larger than the outside diameter of the shaft 51. The ends 62 and 64 of the bore may be beveled or filleted to facilitate sliding the hammer member 52 on the shaft member 51, and also to make it easier to install thereon. The other end of the shaft member 51 has an enlarged portion 68 which has a flat face providing an anvil surface 70 against which the hammer can be moved when operating the device to remove an embedded arrowhead. The enlarged end portion 68 also has a threaded bore 74 for threadably cooperating with a mounting stud 76 the other end of which screws into a stabilizer socket on an archery bow 78 for installing the device 50 as a stabilizer.

To remove an embedded arrow point using the assembly 50 of FIGS. 2 and 3, the assembly is first unscrewed from the archery bow 78, and then the hammer member 52 is unscrewed from the externally threaded end 54 of the shaft member 51. Next the hammer member 52 is slideably mounted on the shaft 51 by having the shaft 51 extend through the bore 60 as shown in FIG. 3. The internally threaded bore 58 is then screwed onto the threaded tail-piece 28' of an embedded arrow point 30'. The hammer member 52 can now be moved back and forth along the shaft member 51 each time striking the anvil face 70 to exert force in a direction to remove the arrowhead. As with the assembly 10, the hammer blows produced by the assembly 50 linearly translate to the embedded point to draw it backwards out of its embedded position, and this occurs without applying any bending or twisting moment either to the embedded arrow point or the arrow point puller assembly itself. After the embedded point is removed, the arrow point puller 50 is reassembled as described above, and is reconnected to the archery bow 78.

Thus there has been shown and described several embodiments of novel arrow point pullers which double as bow stabilizers, which embodiments fulfill all of the objects and advantages sought therefor. It will be apparent to those skilled in the art, however, that many changes, modifications, variations, and other uses and applications for the subject device are possible. All such changes, modifications, variations and other uses and applications which do not depart from the spirit and scope of the invention are deemed to be covered by the invention which is limited only by the claims which follow.

What is claimed is:

1. An arrow point puller and stabilizer device for use in extracting arrow points embedded in objects comprising an elongated shaft member having spaced first and second opposite end portions, means attached to the first end portion of the shaft member forming an outwardly extending anvil portion adjacent thereto, means adjacent the second shaft end portion for attaching to an arrow point, and other means including a hammer member of relatively compact construction to form a weight releasably attached adjacent to said second shaft end portion in spaced opposed relation on the shaft member from the anvil portion, said hammer member having spaced opposed end surfaces and between the end surfaces a bore therethrough for slideably receiving the shaft member, the end surfaces of the hammer member being spaced apart substantially less than the first and second end portions of the shaft member, said hammer member having means thereon for detachably connecting the hammer member to the shaft member adjacent to the second end portion thereof, said hammer member being detachable from the second shaft end portion and thereafter being slideably positioned on the shaft member so that the hammer member can be slideably movable along the shaft member for engagement with the anvil surface whereby a portion of one of the opposed end surfaces of the hammer member can be controllably impacted against the anvil portion to apply force longitudinally of the shaft member and in a direction to extract the arrow point from its embedded position, said shaft member being substantially longer than the hammer member so that a substantial portion of the shaft member is exposed in all positions of the hammer member thereon.

2. The arrow point puller and stabilizer device of claim 1 wherein the second end portion of the shaft member is threaded over a portion thereof, and said hammer member has a threaded bore therein for cooperatively engaging the threaded end portion of the shaft member.

3. The arrow point puller and stabilizer device of claim 1 including means adjacent to the first end portion of the shaft member adaptable for mounting the arrow point puller in an extended position on an archery bow in position to act as a bow stabilizer.

4. An arrow point puller and stabilizer for extracting embedded arrow points comprising a shaft member having first and second ends, an enlargement portion attached to the shaft member adjacent to the first end thereof, said enlargement portion having an anvil surface thereon, means adjacent to the second shaft end for attaching to an arrow point, a hammer member having a cross bore therethrough sized to enable the hammer member to be slideable along the shaft member whereby the hammer member can move into engagement with the anvil surface, said hammer member having a threaded portion, said shaft member having a threaded portion thereon adjacent to the second end thereof, the threaded shaft portion and the threaded hammer member portion being cooperatively engageable for attaching the hammer member to the shaft member adjacent to the second end thereof in spaced relation to the enlargement portion.

5. The arrow point puller and stabilizer of claim 4 including means on the shaft member adjacent to the first end for attaching to an archery bow stabilizer socket.

6. A combination arrow point puller and archery bow stabilizer for installing on a stabilizer socket on an archery bow comprising an elongated rod member having first and second end portions, first rod member connection means attached adjacent to said first end portion and including means thereon for removable attachment to the stabilizer socket of an archery bow, second rod member connection means adjacent to said second end portion for removable attachment to an arrow point, said first rod member connection means including an enlarged anvil portion forming an anvil surface thereon extending outwardly from the rod member adjacent to the first end portion, a hammer member including means thereon for slidably engaging the rod member for movement therealong into striking engagement with the anvil surface when extracting an arrow point, and other means for removably attaching the hammer member to the rod member adjacent to the second end portion thereof and in spaced opposed relation to the anvil portion.

7. The combination of claim 6 wherein said hammer member has a bore therethrough for slideably cooperating with the rod member, the second end portion of said rod member and said hammer member having cooperatively engageable threaded means for fastening the hammer member to the rod member.

8. The combination of claim 6 including a coupling member attached to the second end portion of the rod member, said coupling member having a first portion threadedly connected to the rod member, a second portion for threaded engagement with an arrow point, and a third portion for threaded engagement with the hammer member.

9. The combination of claim 6 wherein said hammer member has a cross bore therethrough for slideably receiving the rod member, and a threaded bore oriented therein at an angle relative to the cross bore, the second end portion of said rod member including a threaded portion for cooperative engagement with the threaded bore in the hammer member.

* * * * *